United States Patent [19]
Minnick

[11] 3,981,295
[45] Sept. 21, 1976

[54] SOLAR HEATING SYSTEM
[75] Inventor: Jim N. Minnick, Kamiah, Idaho
[73] Assignee: The Raymond Lee Organization, Inc., New York, N.Y. ; a part interest
[22] Filed: July 15, 1975
[21] Appl. No.: 596,301

[52] U.S. Cl. .............................. 126/271; 237/1 A
[51] Int. Cl.² ........................................... F24J 3/02
[58] Field of Search ............. 126/270, 271; 237/1 A

[56] References Cited
UNITED STATES PATENTS

| | | | |
|---|---|---|---|
| 1,672,750 | 6/1928 | Christiansen | 126/271 |
| 2,358,476 | 9/1944 | Routh et al. | 126/271 |
| 2,969,918 | 1/1961 | Phelps | 237/1 A |
| 3,822,692 | 7/1974 | Demarest | 126/271 |

Primary Examiner—Kenneth W. Sprague
Attorney, Agent, or Firm—Daniel Jay Tick

[57] ABSTRACT

A solar heating unit comprises an insulated housing having a plurality of sides, a bottom and a transparent top. A pair of copper sheets are provided at the bottom of the housing. A plurality of spacers are provided between the copper sheets and maintain the sheets in spaced parallel relation. Cold water is supplied to the space between the copper sheets and heated water is withdrawn from such space. A plurality of lenses in the housing at the top thereof magnify and concentrate the rays of the sun on the copper sheets to heat the water between such sheets.

3 Claims, 7 Drawing Figures

3,981,295

SOLAR HEATING SYSTEM

DESCRIPTION OF THE INVENTION

The present invention relates to a solar heating system.

Objects of the invention are to provide a solar heating system of simple structure, which is inexpensive in manufacture, installed with facility and convenience, and utilizes the direct rays of the sun for heating water, thereby providing an effective, efficient and reliable solar heating system which does not utilize fuel and which does not pollute the atmosphere.

In order that the invention may be readily carried into effect, it will now be described with reference to the accompanying drawing, wherein.

Figure 1:
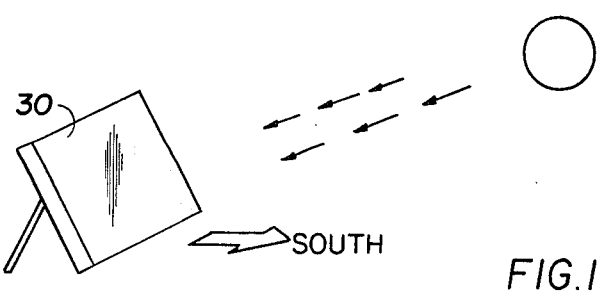
FIG. 1 is a perspective view of an embodiment of the solar heating system of the invention having one solar heating unit.
Figure 4:
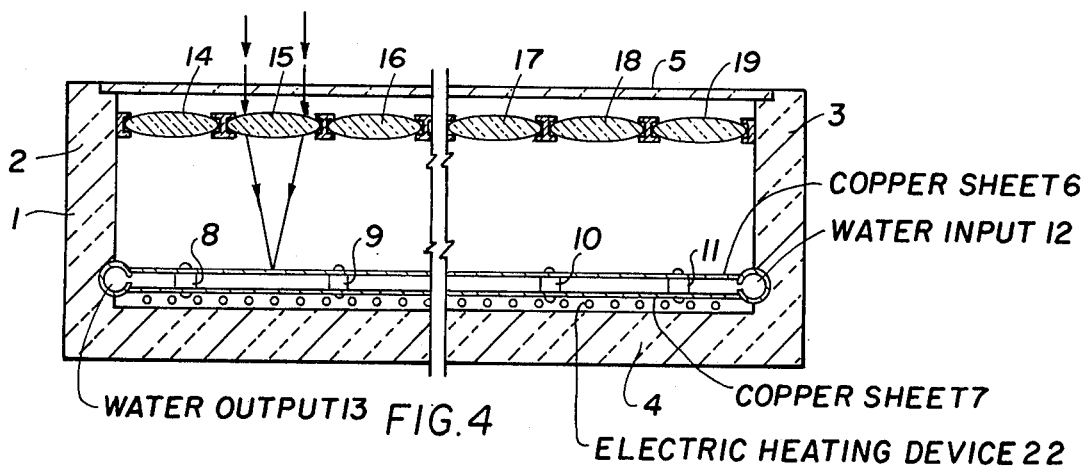
FIG. 4 is a view, on an enlarged scale, partly in section, of a solar heating unit of the invention.

The solar heating system of the invention comprises at least one solar heating unit, as shown in FIG. 1. The solar heating unit of the invention comprises a thermal insulated housing 1 having a plurality of sides, of which two sides 2 and 3 are shown in FIG. 4. As shown in FIG. 4, the solar heating unit has a bottom 4 and a transparent top 5. A pair of copper sheets 6 and 7 are provided on the bottom 4 of the housing 1, as shown in FIG. 4. A plurality of spacers 8, 9, 10, 11, and so on, between the copper sheets 6 and 7 maintain said sheets in spaced substantially parallel relation, as shown in FIG. 4.

Figure 5:
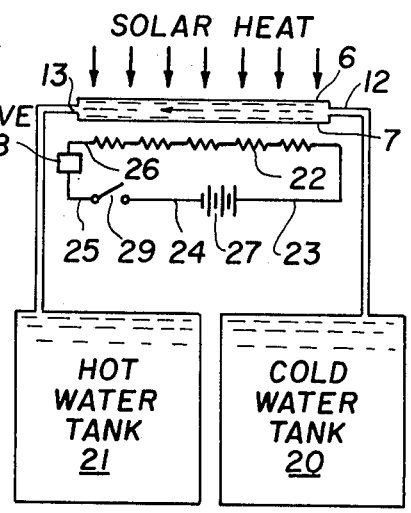
FIG. 5 is a block and circuit diagram of a solar heating unit of the solar heating system of the invention.

As shown in FIGS. 4 and 5, a water input 12 supplies cold water to the space between the copper sheets 6 and 7. A water output 13 withdraws heated water from the space between the copper sheets 6 and 7.

Figure 6:
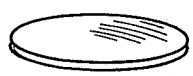
FIG. 6 is a perspective view of an embodiment of a lens of a solar heating unit of the solar heating system of the invention.
Figure 7:
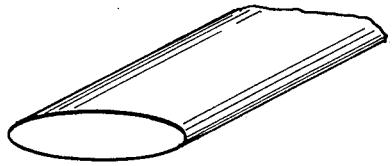
FIG. 7 is a perspective view of another embodiment of a lens of a solar heating unit of the solar heating system of the invention.

As shown in FIG. 4, a lens system is provided in the housing 1 at the top thereof for magnifying and concentrating the rays of the sun on the copper sheets, and more specifically, on the copper sheet 6, to heat the water between the sheets. The lens system comprises a plurality of lenses 14, 15, 16, 17, 18, 19, and so on, in close adjacent matrix configuration in rows and columns. Each lens may be of generally circular or cylindrical configuration, as shown in FIG. 6, or may be of generally elongated configuration, as shown in FIG. 7.

The copper sheets 6 and 7 are spaced less than half an inch from each other, and preferably 1/16th of an inch from each other, since the closer the copper sheets, the more effective and the more rapid the heating action.

As shown in FIG. 5, the cold water may come from a cold water tank 20 and the hot water may be stored in a hot water tank 21. Furthermore, an electric heating device 22 is provided in the housing, beneath the copper sheet 7, for heating the water between the copper sheets. As shown in FIG. 5, an electrical circuit 23, 24, 25, 26 electrically connects the electric heating device 22, a source of electrical energy 27, which may comprise any suitable source of electrical energy such as, for example, a commercial power source or any suitable type of battery or batteries, and a photosensitive switch 28 and an ON-OFF 29 in circuit.

The circuit connections are such that the water between the copper sheets is heated by the electric heating device 22 under the control of the photosensitive switch 28 when the sunlight is beneath a predetermined brightness level. Thus, when the sunlight is bright enough to heat the water, the photosensitive switch 28 keeps the circuit of the electric heating device 22 open. However, when the sunlight becomes too weak to heat the water, the photosensitive switch 28 closes the circuit of the electric heating device 22 and said heating device heats the water.

In the first embodiment, shown in FIG. 1, a single heating unit 30 is inclined at an angle of approximately 45° with the horizontal.

Figure 2:
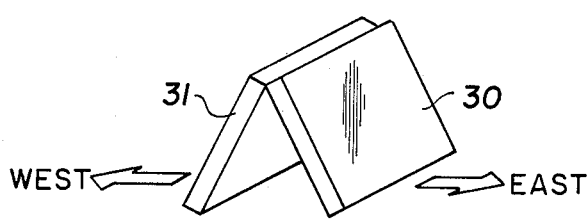
FIG. 2 is a perspective view of another embodiment of the solar heating system of the invention having two solar heating units.

In the second embodiment of the invention, shown in FIG. 2, a second heating unit 31 is inclined at an angle of approximately 90° with the first heating unit 30 and at an angle of approximately 45° with the horizontal.

Figure 3:
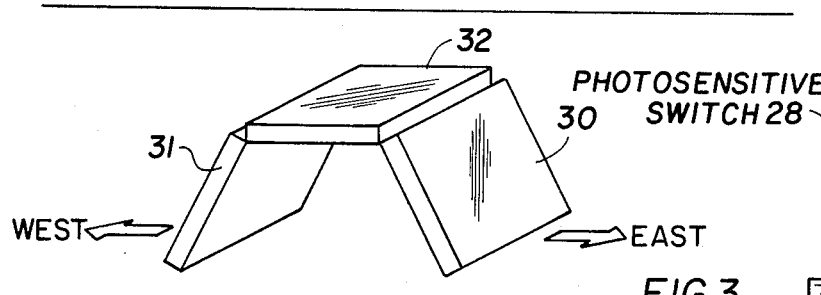
FIG. 3 is a perspective view of still another embodiment of the solar heating system of the invention having three solar heating units.

In the third embodiment of the invention, shown in FIG. 3, a third heating unit 32 is provided substantially horizontal and extends between the first and second units 30 and 31.

While the invention has been described by means of specific examples and in specific embodiments, I do not wish to be limited thereto, for obvious modifications will occur to those skilled in the art without departing from the spirit and scope of the invention.

I claim:

1. A solar heating system, comprising
   at least one heating unit comprising an insulated housing having a plurality of sides, a bottom and a transparent top, a pair of copper sheets at the bottom of the housing, a plurality of spacers between the copper sheets maintaining said sheets in spaced substantially parallel relation less than half an inch from each other, water input means for supplying cold water to the space between the copper sheets, water output means for withdrawing heated water from the space between the copper sheets, and lens means in the housing at the top thereof for magnifying and concentrating the rays of the sun on the copper sheets to heat the water between said sheets;
   electric heating means directly beneath the copper sheets in the housing for heating the water between the copper sheets;
   a source of electrical energy;
   photosensitive switch means; and
   circuit means electrically connecting the heating means, the source of electrical energy and the switch means in circuit in a manner whereby the water is heated by the heating means under the control of the switch means when the sunlight is beneath a predetermined brightness level.

2. A solar heating system as claimed in claim 1, further comprising a second heating unit inclined at an angle of approximately 90° with the first-mentioned unit and at an angle of approximately 45° with the horizontal.

3. A solar heating system as claimed in claim 1, further comprising a second heating unit inclined at an angle of approximately 45° with the horizontal, and a third heating unit substantially horizontal and extending between the first-mentioned and second units, and wherein said first-mentioned unit is at an angle of approximately 45° with the horizontal.

* * * * *